(12) United States Patent
Iizuka et al.

(10) Patent No.: US 8,657,718 B2
(45) Date of Patent: Feb. 25, 2014

(54) AUTOMATIC TRANSMISSION

(71) Applicant: Honda Motor Co., Ltd., Tokyo (JP)

(72) Inventors: Kohei Iizuka, Wako (JP); Soichi Sugino, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/783,394

(22) Filed: Mar. 4, 2013

(65) Prior Publication Data

US 2013/0244826 A1 Sep. 19, 2013

(30) Foreign Application Priority Data

Mar. 13, 2012 (JP) ................................. 2012-056368

(51) Int. Cl.
*F16H 3/44* (2006.01)
(52) U.S. Cl.
USPC ............................ 475/283; 475/275; 475/330
(58) Field of Classification Search
USPC .................. 475/275, 277, 282, 283, 296, 330
See application file for complete search history.

(56) References Cited

U.S. PATENT DOCUMENTS

| 7,780,566 | B2* | 8/2010 | Seo ................................ 475/276 |
| 8,029,405 | B2* | 10/2011 | Kim ............................... 475/280 |
| 8,343,007 | B2* | 1/2013 | Hart et al. ...................... 475/288 |
| 8,430,785 | B2* | 4/2013 | Beck et al. ..................... 475/277 |
| 2011/0045937 | A1* | 2/2011 | Gumpoltsberger et al. .. 475/275 |
| 2012/0108382 | A1* | 5/2012 | Saitoh et al. .................. 475/276 |

FOREIGN PATENT DOCUMENTS

| JP | 2000-161450 | 6/2000 |
| JP | 2001-182785 | 7/2001 |
| JP | 2002-323098 | 11/2002 |
| JP | 2005-273768 | 10/2005 |

* cited by examiner

*Primary Examiner* — Justin Holmes
(74) *Attorney, Agent, or Firm* — Ditthavong Mori & Steiner, P.C.

(57) ABSTRACT

An automatic transmission includes an input shaft, a first planetary gear set, a second planetary gear set, a third planetary gear set, a fourth planetary gear set, and an engagement mechanism. The engagement mechanism includes first to seventh engagement devices. Nine or more forward transmission gear ratios are established by setting each of at least three engagement devices among the first to seventh engagement devices in an engagement mode.

11 Claims, 4 Drawing Sheets

| | B1 | B2 | B3 | F1 | C1 | C2 | C3 | C4 | TRANSMISSION GEAR RATIO | COMMON RATIO |
|---|---|---|---|---|---|---|---|---|---|---|
| Rvs | | ○ | ○ | | | | | ○ | 2.765 | |
| 1st | ○ | ○ | (○) | ○ | | | | | 5.176 | |
| 2nd | ○ | ○ | | | | | ○ | | 3.244 | 1.596 |
| 3rd | ○ | ○ | | | | ○ | | | 2.181 | 1.487 |
| 4th | ○ | | | | | ○ | ○ | | 1.597 | 1.366 |
| 5th | ○ | | | | ○ | ○ | | | 1.306 | 1.223 |
| 6th | | | | | ○ | ○ | ○ | | 1.000 | 1.306 |
| 7th | | ○ | | | ○ | ○ | | | 0.780 | 1.282 |
| 8th | | ○ | | | ○ | | ○ | | 0.652 | 1.197 |
| 9th | | ○ | ○ | | ○ | | | | 0.579 | 1.126 |
| 10th | | | ○ | | ○ | | ○ | | 0.515 | 1.125 |

FIG. 4

AUTOMATIC TRANSMISSION

CROSS-REFERENCE TO RELATED APPLICATIONS

The present application claims priority under 35 U.S.C. §119 to Japanese Patent Application No. 2012-056368, filed Mar. 13, 2012, entitled "Automatic Transmission." The contents of this application are incorporated herein by reference in their entirety.

BACKGROUND OF THE INVENTION

1. Field of the Invention

The present disclosure relates to an automatic transmission.

2. Discussion of the Background

An automatic transmission capable of providing 8-forward-speed transmission using a first planetary gear set for input, second and third planetary gear sets for varying the speed, and six engagement mechanisms has been developed (refer to, for example, Japanese Unexamined Patent Application Publication No. 2005-273768).

According to Japanese Unexamined Patent Application Publication No. 2005-273768, the first planetary gear set for input is formed from a first sun gear, a first ring gear, and a first carrier that supports a pair of first pinions meshed with each other, one of which is meshed with the first sun gear and the other is meshed with the first ring gear. The first pinions can rotate about their own axes and revolve around the first sun gear. That is, the first planetary gear set is a so-called double-pinion planetary gear set. When the carrier is fixed and if the sun gear is rotated, the ring gear rotates in the same direction as the sun gear. Accordingly, such a planetary gear set is also referred to as a "plus planetary gear set" or a "positive planetary gear set". Note that when the ring gear is fixed and if the sun gear is rotated, the ring gear rotates in opposite direction to the sun gear rotation.

In the first planetary gear set, the first sun gear serves as a fixed element that is fixed to a transmission case, the first carrier serves as an input element that is connected to the input shaft, and the first ring gear serves as an output element. The first planetary gear set reduces the rotational speed of the first carrier serving as the input element and outputs the rotation from the first ring gear serving as the output element.

In addition, each of the second and third planetary gear sets for changing transmission gear is formed from a Ravigneaux planetary gear set including a second sun gear, a third sun gear, a second ring gear integrated into a third ring gear, and a second carrier that supports a pair of second pinions meshed with each other, one of which is meshed with the second sun gear and the second ring gear and the other is meshed with the third sun gear. The second pinions can rotate about their own axes and revolve around the second sun gear.

The Ravigneaux planetary gear set includes four rotary elements (i.e., a first rotary element, a second rotary element, a third rotary element, and a fourth rotary element). The first rotary element, the second rotary element, the third rotary element, and the fourth rotary element are arranged in sequence at intervals corresponding to the gear ratios in a collinear diagram (a diagram indicating the ratio of the relative speed of one rotary element to the speed of another rotary element in the form of a straight line) of the Ravigneaux planetary gear set. Then, the first rotary element corresponds to the second sun gear, the second rotary element corresponds to the second carrier integrated into the third carrier, the third rotary element corresponds to the second ring gear integrated into the third ring gear, and the fourth rotary element corresponds to the third sun gear.

The six engagement mechanisms are formed from a first wet multiple disc clutch that releasably connects the first ring gear formed from the output element of the first planetary gear set to the fourth rotary element formed from the third sun gear, a second wet multiple disc clutch that releasably connects the input shaft to the second rotary element formed from the second carrier, a third wet multiple disc clutch that releasably connects the output element formed from the first ring gear to the first rotary element formed from the second sun gear, a fourth wet multiple disc clutch that releasably connects the input element formed from the first carrier to the first rotary element formed from the second sun gear, a first brake that releasably fixes the first rotary element formed from the second sun gear to the transmission case, and a second brake that releasably fixes the second rotary element formed from the second carrier to the transmission case.

According to such a configuration, by setting the first wet multiple disc clutch in a connection mode and setting the second brake in a fixed mode, a first transmission gear ratio is achieved. In addition, by setting the first wet multiple disc clutch in a connection mode and setting the first brake in a fixed mode, a second transmission gear ratio is achieved. By connecting the first wet multiple disc clutch to the third wet multiple disc clutch, a third transmission gear ratio is established. By connecting the first wet multiple disc clutch to the fourth wet multiple disc clutch, a fourth transmission gear ratio is established.

Furthermore, by connecting the first wet multiple disc clutch to the second wet multiple disc clutch, a fifth transmission gear ratio is established. By connecting the second wet multiple disc clutch to the fourth wet multiple disc clutch, a sixth transmission gear ratio is established. By connecting the second wet multiple disc clutch to the third wet multiple disc clutch, a seventh transmission gear ratio is established. By setting the second wet multiple disc clutch in a connection mode and setting the first brake in a fixed mode, an eighth transmission gear ratio is established.

In addition, the above-described existing automatic transmission includes eight trains along the axis line of the input shaft. More specifically, from a side of a torque converter, a first train is formed from the fourth wet multiple disc clutch and the first brake, a second train is formed from the first planetary gear set, a third train is formed from the first wet multiple disc clutch, a fourth train is formed from the third wet multiple disc clutch (note that although the third wet multiple disc clutch seems to be in the same train as the first planetary gear set in a skeleton diagram, a piston and a hydraulic pathway for the third clutch are formed between the first wet multiple disc clutch and the output gear, in reality), a fifth train is formed from the output gear, a sixth train is formed from the second planetary gear set, a seventh train is formed from the third planetary gear set, and an eighth train is formed from the second wet multiple disc clutch and the second brake.

SUMMARY OF THE INVENTION

According to one aspect of the present invention, an automatic transmission includes an input shaft, a first planetary gear set, a second planetary gear set, a third planetary gear set, a fourth planetary gear set, and an engagement mechanism. The input shaft is rotatably supported inside a transmission case and is rotatable by a driving force received from a drive source. A rotational speed of the input shaft is changeable into a plurality of rotational speeds through a plurality of gear ratios to be output from an output member. The first planetary gear set includes a first sun gear, a first carrier, and a first ring gear defined as a first element, a second element, and a third element in a collinear diagram representing relative rotational speed ratios of the first to third elements using straight lines. The first to third elements are arranged in the collinear diagram in sequence from one side of the collinear diagram at intervals corresponding to transmission gear ratios of the collinear diagram. The second planetary gear set includes a second sun gear, a second carrier, and a second ring gear defined as a fourth element, a fifth element, and a sixth element in the collinear diagram representing relative rotational speed ratios of the fourth to sixth elements using straight lines. The fourth to sixth elements are arranged in sequence from one side of the collinear diagram at intervals corresponding to transmission gear ratios of the collinear diagram. The third planetary gear set includes a third sun gear, a third carrier, and a third ring gear defined as a seventh element, an eighth element, and a ninth element in the collinear diagram representing relative rotational speed ratios of the seventh to ninth elements using straight lines. The seventh to ninth elements are arranged in sequence from one side of the collinear diagram at intervals corresponding to transmission gear ratios of the collinear diagram. The fourth planetary gear set includes a fourth sun gear, a fourth carrier, and a fourth ring gear defined as a tenth element, an eleventh element, and a twelfth element in the collinear diagram, the tenth to twelfth elements being arranged in sequence from one side of the collinear diagram at intervals corresponding to transmission gear ratios of the collinear diagram. The first element is connected to the input shaft. The tenth element is connected to the output member. The second element is connected to the fifth and ninth elements to form a first connected member. The third element is connected to the twelfth element to form a second connected member. The eighth element is connected to the eleventh element to form a third connected member. The engagement mechanism includes first to seventh engagement devices. The first engagement device is switchable between an engagement mode in which the first element is connected to the third connected member and a release mode in which the first element is disconnected from the third connected member. The second engagement device is switchable between an engagement mode in which the first element is connected to the fourth element and a release mode in which the first element is disconnected from the fourth element. The third engagement device is switchable between an engagement mode in which the sixth element is connected to the second connected member and a release mode in which the sixth element is disconnected from the second connected member. The fourth engagement device is switchable between an engagement mode in which any two of the tenth element, the second connected member, and the third connected member are connected to each other and a release mode in which said two of the tenth element, the second connected member, and the third connected member are disconnected from each other. The fifth engagement device is switchable between an engagement mode in which the seventh element is connected to the transmission case and a release mode in which the seventh element is disconnected from the transmission case. The sixth engagement device is switchable between an engagement mode in which the sixth element is connected to the transmission case and a release mode in which the sixth element is disconnected from the transmission case. The seventh engagement device is switchable between an engagement mode in which the fourth element is connected to the transmission case and a release mode in which the fourth element is disconnected from the transmission case. Nine or more forward transmission gear ratios are established by setting each of at least three engagement devices among the first to seventh engagement devices in the engagement mode.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
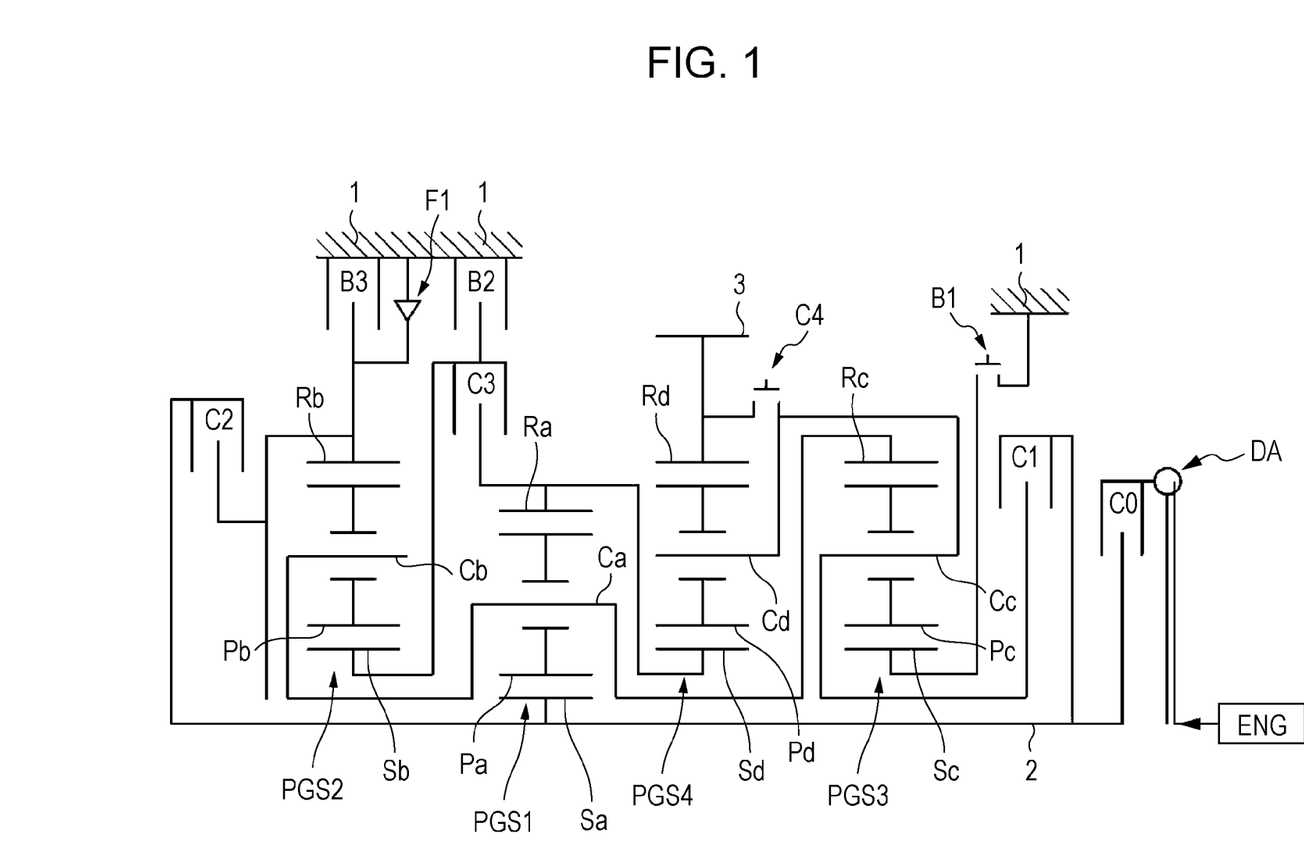
FIG. 1 is a schematic diagram of an automatic transmission according to a first exemplary embodiment of the present disclosure.

FIG. 1 illustrates an automatic transmission according to a first exemplary embodiment of the disclosure. According to the first exemplary embodiment, the automatic transmission includes an input shaft 2 rotatably supported in a transmission case 1 and an output member 3 that is formed from an output gear. A driving force output from a drive source ENG, such as an internal combustion engine (an engine) (not illustrated), is transferred to the input shaft 2 via a damper DA and a start clutch C0. The start clutch C0 is switchable between a transfer mode in which the power of the drive source ENG can be transferred to the input shaft 2 and a release mode in which the power is not transferred.

The rotation of the output member 3 is transferred to the right and left drive wheels of a vehicle via a differential gear and a propeller shaft (neither is illustrated). Note that instead of the start clutch C0, a torque converter having a lockup clutch may be employed.

In the transmission case 1, first to fourth planetary gear sets PGS1 to PGS4 are arranged so as to be concentric with the input shaft 2. The first planetary gear set PGS1 is a single-pinion planetary gear set including a sun gear Sa, a ring gear Ra, and a carrier Ca that supports a pinion Pa meshed with the sun gear Sa and the ring gear Ra so that the pinion Pa is rotatable about its axis and is revolvable around the sun gear Sa. When the carrier is fixed and if the sun gear is rotated, the ring gear rotates in opposite direction to the sun gear rotation. Accordingly, a single-pinion planetary gear set is also referred to as a "minus planetary gear set" or a "negative planetary gear set". Note that when the ring gear is fixed and if the ring gear is rotated, the sun gear and the carrier rotate in the same direction.

Figure 2:
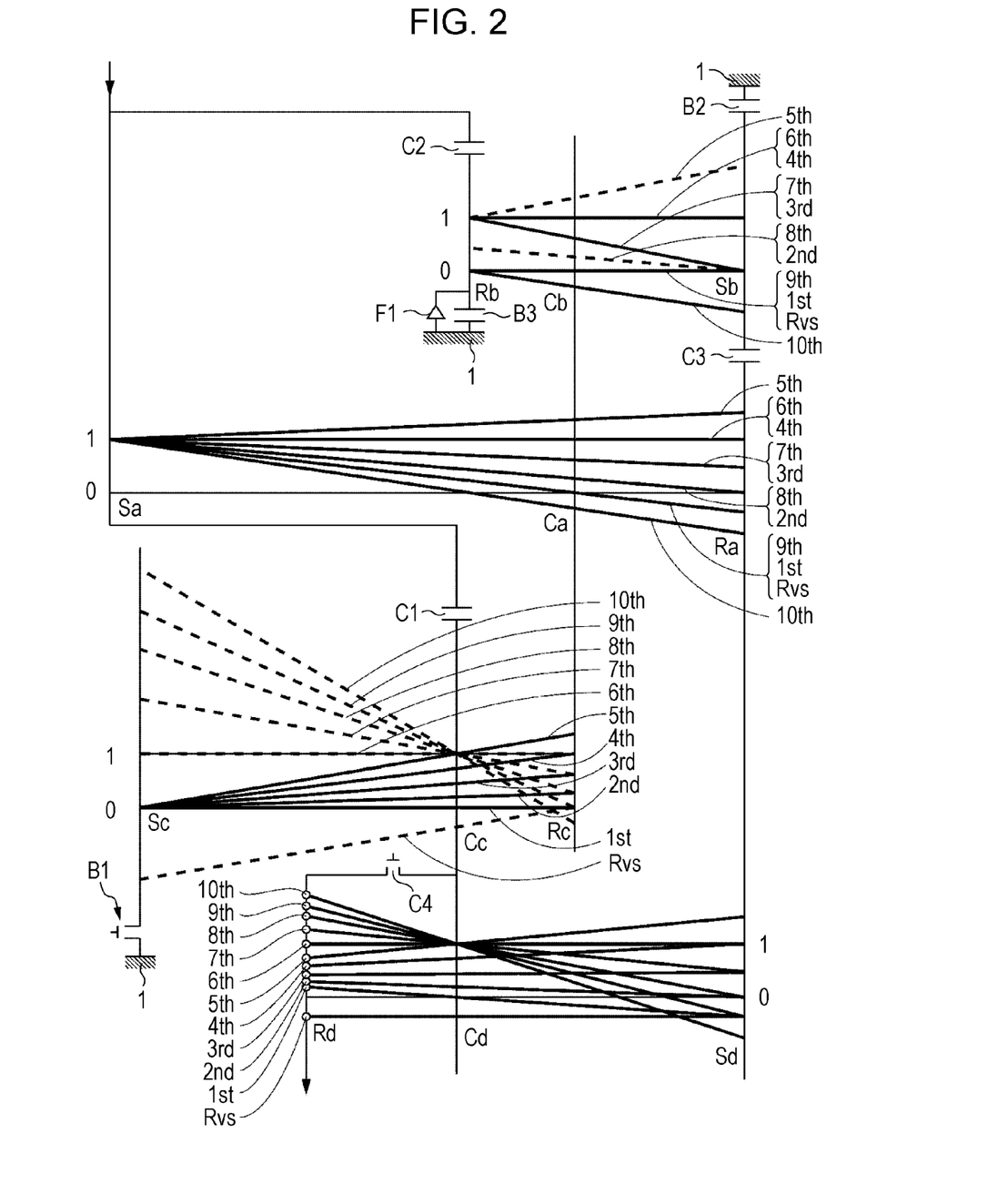
FIG. 2 is a collinear diagram illustrating the relative speed ratios of elements of first to fourth planetary gear sets of the automatic transmission according to the first exemplary embodiment.

Referring to a collinear diagram (a diagram indicating relative rotational speed ratios among three elements, that is, a ring gear, a carrier, and the ring gear, in the form of straight lines (speed lines)) of the first planetary gear set PGS1 illustrated in a second section from the top of FIG. 2, let three elements Sa, Ca, and Ra of the first planetary gear set PGS1 denote a first element, a second element, and a third element arranged from the left at intervals corresponding to the gear ratios (the number of the teeth of the ring gear/the number of the teeth of the ring gear). Then, the first element corresponds to the sun gear Sa, the second element corresponds to the carrier Ca, and the third element corresponds to the ring gear Ra.

Herein, let h denote the gear ratio of the first planetary gear set PGS1. Then, the ratio of the distance between the sun gear Sa and the carrier Ca to the distance between the carrier Ca and the ring gear Ra is set to h:1. Note that in the collinear diagram, the lower horizontal line indicates that the rotational speed is "0". In contrast, the upper horizontal line (a line that overlaps the line indicated by "4th" and "6th") indicates that the rotational speed is "1" (i.e., the rotational speed is the same as the rotational speed of the input shaft 2).

Similarly, the second planetary gear set PGS2 is a single-pinion planetary gear set including a sun gear Sb, a ring gear Rb, and a carrier Cb that supports a pinion Pb meshed with the sun gear Sb and the ring gear Rb so that the pinion Pb is rotatable about its axis and is revolvable around the sun gear Sb.

Referring to the collinear diagram of the second planetary gear set PGS2 illustrated in a first section (the uppermost section) of FIG. 2, let three elements Sb, Cb, and Rb of the second planetary gear set PGS2 denote a fourth element, a fifth element, and a sixth element arranged from the left at intervals corresponding to the gear ratios. Then, the fourth element corresponds to the ring gear Rb, the fifth element corresponds to the carrier Cb, and the sixth element corresponds to the sun gear Sb. The ratio of the distance between the sun gear Sb and the carrier Cb to the distance between the carrier Cb and the ring gear Rb is set to i:1, where "i" denotes the gear ratio of the second planetary gear set PGS2.

Similarly, the third planetary gear set PGS3 is a single-pinion planetary gear set including a sun gear Sc, a ring gear Rc, and a carrier Cc that supports a pinion Pc meshed with the sun gear Sc and the ring gear Rc so that the pinion Pc is rotatable about its axis and is revolvable around the sun gear Sc.

Referring to the collinear diagram of the third planetary gear set PGS3 illustrated in a third section from the top of FIG. 2, let three elements Sc, Cc, and Rc of the third planetary gear set PGS3 denote a seventh element, an eighth element, and a ninth element arranged from the left at intervals corresponding to the gear ratios. Then, the seventh element corresponds to the sun gear Sc, the eighth element corresponds to the carrier Cc, and the ninth element corresponds to the ring gear Rc. The ratio of the distance between the sun gear Sc and the carrier Cc to the distance between the carrier Cc and the ring gear Rc is set to j:1, where "j" denotes the gear ratio of the third planetary gear set PGS3.

Similarly, the fourth planetary gear set PGS4 is a single-pinion planetary gear set including a sun gear Sd, a ring gear Rd, and a carrier Cd that supports a pinion Pd meshed with the sun gear Sd and the ring gear Rd so that the pinion Pd is rotatable about its axis and is revolvable around the sun gear Sd.

Referring to the collinear diagram of the fourth planetary gear set PGS4 illustrated in a fourth section from the top of FIG. 2, let three elements Sd, Cd, and Rd of the fourth planetary gear set PGS4 denote a tenth element, an eleventh element, and a twelfth element arranged from the left at intervals corresponding to the gear ratios. Then, the tenth element corresponds to the ring gear Rd, the eleventh element corresponds to the carrier Cd, and the twelfth element corresponds to the sun gear Sd. The ratio of the distance between the sun gear Sd and the carrier Cd to the distance between the carrier Cd and the ring gear Rd is set to k:1, where "k" denotes the gear ratio of the fourth planetary gear set PGS4.

The sun gear Sa (the first element) of the first planetary gear set PGS1 is connected to the input shaft 2. In addition, the ring gear Rd (the tenth element) of the fourth planetary gear set PGS4 has the output member 3 on the outer periphery thereof. The output member 3 is formed from external teeth (an output gear).

In addition, the carrier Ca (the second element) of the first planetary gear set PGS1 is connected to the carrier Cb (the fifth element) of the second planetary gear set PGS2 and the ring gear Rc (the ninth element) of the third planetary gear set PGS3 and, thus, a first connected member Ca-Cb-Rc is formed. In addition, the ring gear Ra (the third element) of the first to fourth planetary gear set PGS1 is connected to the sun gear Sd (the twelfth element) of the fourth planetary gear set PGS4 and, thus, a second connected member Ra-Sd is formed. Furthermore, the carrier Cc (the eighth element) of the third planetary gear set PGS3 is connected to the carrier Cd (the eleventh element) of the fourth planetary gear set PGS4 and, thus, a third connected member Cc-Cd is formed.

Furthermore, according to the first exemplary embodiment, the automatic transmission includes seven engagement mechanisms formed from four clutches, that is, first to fourth clutches C1 to C4, and three brakes, that is, first to third brakes B1 to B3.

The first clutch C1 is an oil pressure driven wet multiple disc clutch (a friction engagement clutch). The first clutch C1 is configured so as to be switchable between a connection mode in which the sun gear Sa (the first element) of the first planetary gear set PGS1 is connected to the third connected member Cc-Cd and a release mode in which the sun gear Sa is disconnected from the third connected member Cc-Cd. The second clutch C2 is an oil pressure driven wet multiple disc clutch (a friction engagement clutch). The second clutch C2 is configured so as to be switchable between a connection mode in which the sun gear Sa (the first element) of the first planetary gear set PGS1 is connected to the ring gear Rb (the fourth element) of the second planetary gear set PGS2 and a release mode in which the sun gear Sa is disconnected from the ring gear Rb.

The third clutch C3 is an oil pressure driven wet multiple disc clutch (a friction engagement clutch). The third clutch C3 is configured so as to be switchable between a connection mode in which the sun gear Sb (the sixth element) of the second planetary gear set PGS2 is connected to the second connected member Ra-Sd and a release mode in which the sun gear Sb is disconnected from the second connected member Ra-Sd. The fourth clutch C4 is a meshing mechanism formed from, for example, a dog clutch or a synchromesh gearbox having a synchronization capability. The fourth clutch C4 is configured so as to be switchable between a connection mode in which the ring gear Rd (the tenth element) of the fourth planetary gear set PGS4 is connected to the third connected member Cc-Cd and a release mode in which the ring gear Rd is disconnected from the third connected member Cc-Cd. Note that according to the first exemplary embodiment, the fourth clutch is not limited thereto. For example, the fourth clutch C4 may be configured so as to be switchable between a connection mode in which the ring gear Rd (the tenth element) of the fourth planetary gear set PGS4 is connected to the second connected member Ra-Sd and a release mode in which the ring gear Rd is disconnected from the second connected member Ra-Sd. Alternatively, according to the first exemplary embodiment, for example, the fourth clutch C4 may be configured so as to be switchable between a connection mode in which the second connected member Ra-Sd is connected to the third connected member Cc-Cd and a release mode in which the second connected member Ra-Sd is disconnected from the third connected member Cc-Cd.

The first brake B1 is a meshing mechanism formed from, for example, a dog clutch or a synchromesh gearbox. The first brake B1 is configured so as to be switchable between a fixed mode in which the sun gear Sc (the seventh element) of the third planetary gear set PGS3 is fixed to the transmission case 1 and a release mode in which the sun gear Sc is unfixed from the transmission case 1.

The second brake B2 is an oil pressure driven wet multiple disc brake. The second brake B2 is configured so as to be switchable between a fixed mode in which the sun gear Sb (the sixth element) of the second planetary gear set PGS2 is fixed to the transmission case 1 and a release mode in which the sun gear Sb is unfixed from the transmission case 1. The third brake B3 is an oil pressure driven wet multiple disc brake (a friction engagement clutch). The third brake B3 is configured so as to be switchable between a fixed mode in which the ring gear Rb (the fourth element) of the second planetary gear set PGS2 is fixed to the transmission case 1 and a release mode in which the ring gear Rb is unfixed from the transmission case 1. In addition, according to the first exemplary embodiment, the automatic transmission includes a one-way clutch F1 that is disposed parallel to the third brake B3. The one-way clutch F1 allows the normal rotation of the ring gear Rb (the fourth element) of the second planetary gear set PGS2 and inhibits the reverse rotation of the ring gear Rb.

The modes of the clutches C1 to C4 and the brakes B1 to B3 are switched by a transmission control unit (not illustrated) on the basis of vehicle information, such as a traveling speed of the vehicle.

The cases in which the gear ratios of the automatic transmission according to the first exemplary embodiment are established are described next with reference to FIGS. 2 and 3.

In order to establish a first transmission gear ratio, each of the first brake B1 and the second brake B2 is set in a fixed mode. By setting the first brake B1 and the second brake B2 in the fixed mode, each of the rotational speed of the sun gear Sb (the sixth element) of the second planetary gear set PGS2 and the rotational speed of the sun gear Sc (the seventh element) of the third planetary gear set PGS3 is set to "0". In addition, due to the operation performed by the one-way clutch F1, the rotational speed of the ring gear Rb (the fourth element) of the second planetary gear set PGS2 is set to "0".

Thus, the fourth to sixth elements Sb, Cb, and Rb of the second planetary gear set PGS2 and the seventh to ninth elements Sc, Cc, and Rc of the third planetary gear set PGS3 enter the lock mode in which relative rotation of the elements is disabled. Accordingly, the rotational speed of each of the elements Sb, Cb, Rb, Sc, Cc, and Rc is set to "0". In addition, the rotational speed of the third connected member Cc-Cd including the carrier Cc (the eighth element) of the third planetary gear set PGS3 is set to "0". Furthermore, the rotational speed of the ring gear Rd (the tenth element) of the fourth planetary gear set PGS4 is set to "1st" illustrated in FIG. 2. In this manner, the first transmission gear ratio is established.

Since the one-way clutch F1 is disposed parallel to the third brake B3, the third brake B3 need not be in the fixed mode if the transmission is in the first gear ratio in which the output torque is large. Accordingly, a frictional force required by the third brake B3 can be reduced and, therefore, friction can be reduced. Thus, the third brake B3 is set in a release mode, and friction caused when differential rotation occurs can be reduced.

Note that in the first transmission gear ratio, the third brake B3 is in a release mode. Accordingly, the number of releases of the engagement mechanism is "5". However, since the rotational speed of the ring gear Rb (the fourth element) of the second planetary gear set PGS2 is set to "0" due to the operation performed by the one-way clutch F1. Therefore, friction loss does not occur in the third brake B3. Therefore, in the first transmission gear ratio, the actual number of releases is "4". In addition, in order to activate engine brake in the first transmission gear ratio, the third brake B3 can be switched to a fixed mode.

In order to establish a second transmission gear ratio, the first brake B1 and the second brake B2 are set in a fixed mode, and the third clutch C3 is set in a connection mode. By setting the first brake B1 in the fixed mode, the rotational speed of the sun gear Sc of the third planetary gear set PGS3 is set to "0". In addition, by setting the second brake B2 in the fixed mode, the rotational speed of the sun gear Sb (the sixth element) of the second planetary gear set PGS2 is set to "0".

In addition, by setting the third clutch C3 in a connection mode, the rotational speeds of the second connected member Ra-Sd and the sun gear Sb (the sixth element) of the second planetary gear set PGS2 are set to the same speed "0". Furthermore, the rotational speed of the ring gear Rd (the tenth element) of the fourth planetary gear set PGS4 is set to "2nd" illustrated in FIG. 2. In this manner, the second transmission gear ratio is established.

In order to establish a third transmission gear ratio, the first brake B1 and the second brake B2 are set in a fixed mode. In addition, the second clutch C2 is set in a connection mode. By setting the first brake B1 in the fixed mode, the rotational speed of the sun gear Sc (the seventh element) of the third planetary gear set PGS3 is set to "0". Furthermore, by setting the second brake B2 in the fixed mode, the rotational speed of the sun gear Sb (the sixth element) of the second planetary gear set PGS2 is set to "0".

In addition, by setting the second clutch C2 in a connection mode, the rotational speed of the ring gear Rb (the fourth element) of the second planetary gear set PGS2 is set to "1", which is the same rotational speed as that of the sun gear Sa (the first element) of the first to fourth planetary gear set PGS1 connected to the input shaft 2. Since the rotational speed of the sun gear Sb (the sixth element) of the second planetary gear set PGS2 is set to "0" and the rotational speed of the ring gear Rb (the fourth element) is set to "1", the rotational speed of the carrier Cb (the fifth element), that is, the rotational speed of the first connected member Ca-Cb-Rc, is set to i/(i+1). In addition, the rotational speed of the ring gear Rd (the tenth element) of the fourth planetary gear set PGS4 is set to "3rd" illustrated in FIG. 2. In this manner, the third transmission gear ratio is established.

In order to establish a fourth transmission gear ratio, the first brake B1 is set in a fixed mode, and the second clutch C2 and the third clutch C3 are set in a connection mode. By setting the first brake B1 in the fixed mode, the rotational speed of the sun gear Sc (the seventh element) of the third planetary gear set PGS3 is set to "0".

In addition, by setting the third clutch C3 in the connection mode, the sun gear Sb (the sixth element) of the second planetary gear set PGS2 and the second connected member Ra-Sd rotate at the same speed. Thus, the carrier Ca (the second element) of the first planetary gear set PGS1 is connected to the carrier Cb (the fifth element) of the second planetary gear set PGS2, and the ring gear Ra (the third element) of the first planetary gear set PGS1 is connected to the sun gear Sb (the sixth element) of the second planetary gear set PGS2. Accordingly, in the fourth transmission gear ratio in which the third clutch C3 is in a connection mode, a collinear diagram including four rotary elements in the first planetary gear set PGS1 and the second planetary gear set PGS2 can be obtained.

By setting the second clutch C2 in a connection mode, the rotational speed of the ring gear Rb (the fourth element) of the second planetary gear set PGS2 is set to "1", which is the same rotational speed as that of the sun gear Sa (the first element) of the first planetary gear set PGS1. Accordingly, two of the four rotary elements formed from the first planetary gear set PGS1 and the second planetary gear set PGS2 have the same rotational speed "1".

Accordingly, the elements of the first planetary gear set PGS1 and the second planetary gear set PGS2 are set in a lock mode in which relative rotation of the elements are disabled and, thus, the rotational speeds of all of the elements of the first planetary gear set PGS1 and the second planetary gear set PGS2 are set to "1". In addition, the rotational speed of the third connected member Cc-Cd is set to j/(j+1), and the rotational speed of the ring gear Rd (the tenth element) of the fourth planetary gear set PGS4 is set to "4th" illustrated in FIG. 2. In this manner, the fourth transmission gear ratio is established.

In order to establish a fifth transmission gear ratio, the first brake B1 is set in a fixed mode, and the first clutch C1 and the second clutch C2 are set in a connection mode. By setting the first brake B1 in the fixed mode, the rotational speed of the sun gear Sc (the seventh element) of the third planetary gear set PGS3 is set to "0".

In addition, by setting the first clutch C1 in the connection mode, the rotational speed of the third connected member Cc-Cd is set to "1", which is the same rotational speed as that of the sun gear Sa (the first element) of the first planetary gear set PGS1. Thus, the rotational speed of the ring gear Rd (the tenth element) of the fourth planetary gear set PGS4 is set to "5th" illustrated in FIG. 2. In this manner, the fifth transmission gear ratio is established.

Note that in order to establish the fifth transmission gear ratio, the second clutch C2 need not be set in the connection mode. However, in the fourth transmission gear ratio and the sixth transmission gear ratio (described in more detail below), the second clutch C2 needs to be set in a connection mode. Accordingly, in order to smoothly perform downshift from the fifth gear to the fourth gear and upshift from the fifth gear to the sixth gear, the second clutch C2 is set in a connection mode even in the fifth transmission gear ratio.

In order to establish a sixth transmission gear ratio, the first to third clutches C1 to C3 are set in a connection mode. By setting the second clutch C2 and the third clutch C3 in the connection mode, the elements of the first planetary gear set PGS1 and the second planetary gear set PGS2 are set in a mode in which relative rotation of the elements are disabled, as described in the fourth transmission gear ratio. Thus, the rotational speed of the second connected member Ra-Sd is set to "1". In addition, by setting the first clutch C1 in the connection mode, the rotational speed of the third connected member Cc-Cd is set to "1".

Accordingly, the rotational speeds of the carrier Cd (the eleventh element) and the sun gear Sd (the twelfth element) of the fourth planetary gear set PGS4 are set to "1". Thus, the elements are set in a mode in which relative rotation of the elements is disabled. Consequently, the rotational speed of the ring gear Rd (the tenth element) of the fourth planetary gear set PGS4 is set to "1" indicated by "6th" illustrated in FIG. 2. In this manner, the sixth transmission gear ratio is established.

In order to establish a seventh transmission gear ratio, the second brake B2 is set in the fixed mode, and the first clutch C1 and the second clutch C2 are set in the connection mode. By setting the second brake B2 in the fixed mode, the rotational speed of the sun gear Sb (the sixth element) of the second planetary gear set PGS2 is set to "0".

By setting the second clutch C2 in the connection mode, the rotational speed of the ring gear Rb (the fourth element) of the second planetary gear set PGS2 is set to "1", which is the same rotational speed as that of the sun gear Sa (the first element) of the first planetary gear set PGS1. Thus, the rotational speed of the first connected member Ca-Cb-Rc including the carrier Cb (the fifth element) of the second planetary gear set PGS2 is set to i/(i+1).

In addition, by setting the first clutch C1 in the connection mode, the rotational speed of the third connected member Cc-Cd is set to "1", which is the same rotational speed as that of the sun gear Sa (the first element) of the first planetary gear set PGS1 connected to the input shaft 2. Thus, the rotational speed of the ring gear Rd (the tenth element) of the fourth planetary gear set PGS4 is set to "7th" illustrated in FIG. 2. In this manner, the seventh transmission gear ratio is established.

In order to establish an eighth transmission gear ratio, the second brake B2 is set in the fixed mode, and the first clutch C1 and the third clutch C3 are set in the connection mode. By setting the second brake B2 in the fixed mode, the rotational speed of the sun gear Sb (the sixth element) of the second planetary gear set PGS2 is set to "0". In addition, by setting the third clutch C3 in the connection mode, the rotational speed of the second connected member Ra-Sd is set to "0", which is the same rotational speed as that of the sun gear Sb (the sixth element) of the second planetary gear set PGS2.

In addition, by setting the first clutch C1 in the connection mode, the rotational speed of the third connected member Cc-Cd is set to "1", which is the same rotational speed as that of the sun gear Sa (the first element) of the first planetary gear set PGS1. Thus, the rotational speed of the ring gear Rd (the tenth element) of the fourth planetary gear set PGS4 is set to "8th" illustrated in FIG. 2. In this manner, the eighth transmission gear ratio is established.

In order to establish a ninth transmission gear ratio, the second brake B2 and the third brake B3 are set in the fixed mode, and the first clutch C1 is set in the connection mode. By setting the second brake B2 in the fixed mode, the rotational speed of the sun gear Sb (the sixth element) of the second planetary gear set PGS2 is set to "0". In addition, by setting the third brake B3 in the fixed mode, the rotational speed of the ring gear Rb (the fourth element) of the second planetary gear set PGS2 is also set to "0". Accordingly, the elements Sb, Cb, and Rb of the second planetary gear set PGS2 are set in a mode in which relative rotation of the elements are disabled. Thus, the rotational speed of the first connected member Ca-Cb-Rc including the carrier Cb (the fifth element) of the second planetary gear set PGS2 is also set to "0".

In addition, by setting the first clutch C1 in the connection mode, the rotational speed of the third connected member Cc-Cd is set to "1", which is the same rotational speed as that of the sun gear Sa (the first element) of the first planetary gear set PGS1. Thus, the rotational speed of the ring gear Rd (the tenth element) of the fourth planetary gear set PGS4 is set to "9th" illustrated in FIG. 2. In this manner, the ninth transmission gear ratio is established.

In order to establish a tenth transmission gear ratio, the third brake B3 is set in the fixed mode, and the first clutch C1 and the third clutch C3 are set in the connection mode. By setting the third clutch C3 in the connection mode, the second connected member Ra-Sd and the sun gear Sb (the sixth element) of the second planetary gear set PGS2 rotate at the same speed. In addition, by setting the third brake B3 in the fixed mode, the rotational speed of the ring gear Rb (the fourth element) of the second planetary gear set PGS2 is set to "0".

In addition, by setting the first clutch C1 in the connection mode, the rotational speed of the third connected member Cc-Cd is set to "1", which is the same rotational speed as that of the sun gear Sa (the first element) of the first planetary gear set PGS1. Thus, the rotational speed of the ring gear Rd (the tenth element) of the fourth planetary gear set PGS4 is set to "10th" illustrated in FIG. 2. In this manner, the tenth transmission gear ratio is established.

In order to establish a reverse gear, the second brake B2 and the third brake B3 are set in the fixed mode, and the fourth clutch C4 is set in the connection mode. By setting the second brake B2 and the third brake B3 in the fixed mode, the elements of the second planetary gear set PGS2 are set in a mode in which relative rotation of the elements is disabled. Thus, the rotational speed of the first connected member Ca-Cb-Rc is set to "0". Accordingly, the rotational speed of the second connected member Ra-Sd is set to 1/h, which is a negative value (reverse rotation). In addition, by setting the fourth clutch C4 in the connection mode, the ring gear Rd (the tenth element) of the fourth planetary gear set PGS4 is connected to the third connected member Cc-Cd and, therefore, the elements of the fourth planetary gear set PGS4 are set in a lock mode in which relative rotation of the elements is disabled. Thus, the rotational speed of the ring gear Rd (the tenth element) of the fourth planetary gear set PGS4 is set to 1/h indicated by "Rvs" illustrated in FIG. 2. In this manner, the reverse gear is established.

Note that the speed line indicated by a dashed line in FIG. 2 indicates that among the four planetary gear sets PGS1 to PGS4, elements of the planetary gear sets other than the planetary gear set that transfers drive power rotate (rotate idle) while following the planetary gear set that transfers the drive power.

Figure 3:
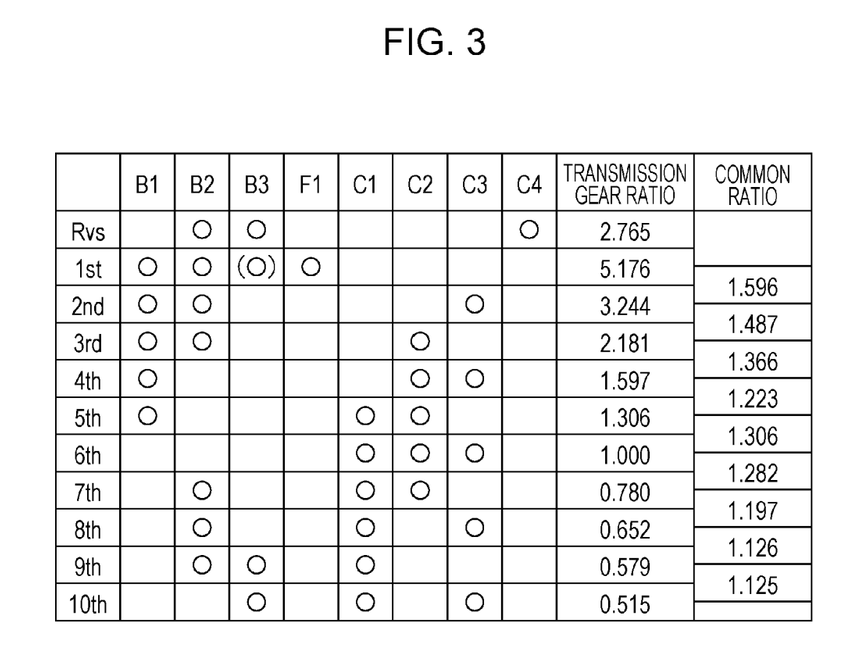
FIG. 3 illustrates all modes of engagement mechanisms for each of gear ratios of the automatic transmission according to the first exemplary embodiment.

FIG. 3 illustrates all the modes of the clutches C1 to C4 and the brakes B1 to B3 in the above-described transmission gear ratios. The symbol "O" in the columns of the first to fourth clutches C1 to C4 and the first to third brakes B1 to B3 indicates the connection mode or the fixed mode. The empty cells indicate the release mode. In addition, the symbol "O" in the column of the one-way clutch F1 indicates that the rotational speed of the ring gear Rb of the second planetary gear set PGS2 is set to "0" due to the operation performed by the one-way clutch F1. Furthermore, the symbol "(O)" in the column of the third brake B3 indicates that the third brake B3 is set in a connection mode when engine brake is applied.

FIG. 3 further illustrates the transmission gear ratios (the rotational speed of the input shaft 2/the rotational speed of the output member 3) and the common ratios (the ratio of one of the transmission gear ratios to the next transmission gear ratio, that is, a value obtained by dividing some transmission gear ratio by the transmission gear ratio that is one-step higher than the transmission gear ratio). In FIG. 3, the gear ratio h of the first planetary gear set PGS1 is set to 2.765, the gear ratio i of the second planetary gear set PGS2 is set to 1.581, the gear ratio j of the third planetary gear set PGS3 is set to 3.105, and the gear ratio k of the fourth planetary gear set PGS4 is set to 1.872. As can be seen from FIG. 3, the common ratios can be set to appropriate values.

According to the first exemplary embodiment, the automatic transmission can provide ten forward gear ratios and one reverse gear ratio. In addition, in each of the transmission gear ratios, the number of the engagement mechanisms of the wet multiple disc clutches and the wet multiple disc brakes that are set in the release mode (the number of releases) is less than or equal to 4. Thus, although 10 speed transmission gear ratios are provided, an increase in friction loss from the friction loss in the existing 8-forward-speed transmission can be prevented.

In addition, since the one-way clutch F1 is provided together with the third brake B3, the need for switching the mode of the third brake B3 when first gear is shifted to second gear and vice versa can be eliminated. Thus, the transmission controllability can be improved.

Note that while the first exemplary embodiment has been described with reference to the first brake B1 and the fourth clutch C4 each formed from a meshing mechanism, each of the first brake B1 and the fourth clutch C4 may be formed from a wet multiple disc brake. Even in such a case, the number of releases of the wet multiple disc clutches and the wet multiple disc brakes in each of the transmission gear ratios can be less than or equal to four. Thus, friction loss can be reduced. That is, the advantage of the present disclosure can be provided.

In addition, in the automatic transmission according to the present exemplary embodiment, even when one of the transmission gear ratios (e.g., the tenth transmission gear ratio) is removed and 9-forward-speed transmission is employed, the advantage of the present disclosure can be provided.

Furthermore, the one-way clutch F1 may be removed. In such a case, the third brake B3 can be set in the fixed mode when the first transmission gear ratio is achieved. Still furthermore, the third brake B3 may be configured as a meshing mechanism formed from, for example, a dog clutch or a synchromesh gearbox.

Figure 4:
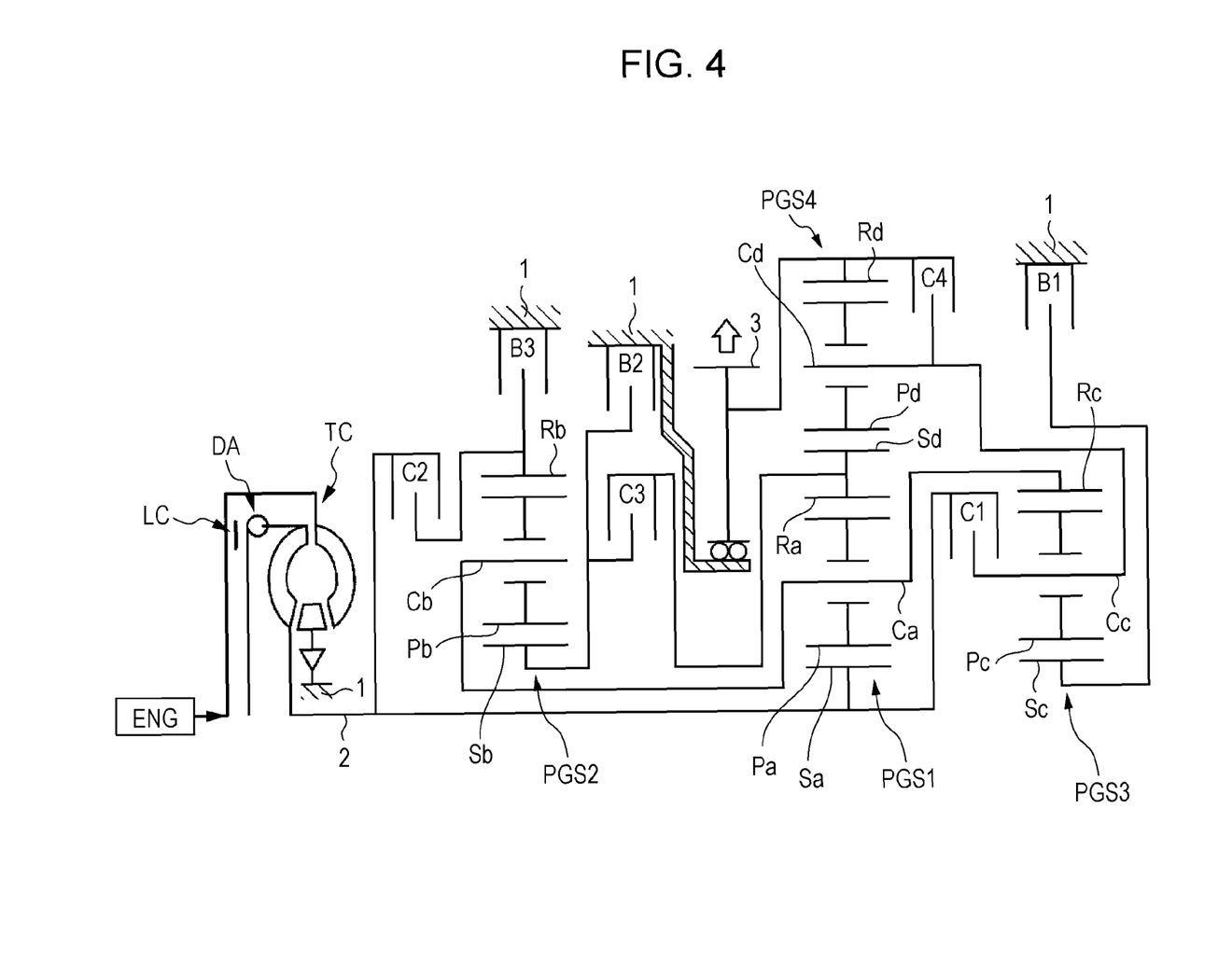
FIG. 4 is a schematic diagram of an automatic transmission according to a second exemplary embodiment of the present disclosure.

FIG. 4 illustrates an automatic transmission according to a second exemplary embodiment of the present disclosure. Unlike the first exemplary embodiment, according to the second exemplary embodiment, the automatic transmission includes a torque converter TC having a lockup clutch LC and a damper DA instead of the start clutch C0.

In the automatic transmission according to the second exemplary embodiment, the fourth planetary gear set PGS4 is disposed outward of the first planetary gear set PGS1 in the radial direction. The ring gear Ra (the third element) of the first planetary gear set PGS1 and the sun gear Sd (the twelfth element) of the fourth planetary gear set PGS4 are integrally connected so as to form a second connected member Ra-Sd. By disposing the fourth planetary gear set PGS4 outward of the first planetary gear set PGS1 in the radial direction, the first planetary gear set PGS1 overlaps the fourth planetary gear set PGS4 in the radial direction. Accordingly, the length of the automatic transmission in the axis direction can be decreased.

Note that the first planetary gear set PGS1 can at least partially overlap the fourth planetary gear set PGS4 in the radial direction. Thus, the length of the automatic transmission in the axis direction can be decreased. However, if the first planetary gear set PGS1 completely overlaps the fourth planetary gear set PGS4 in the radial direction, the length of the automatic transmission in the axis direction can be minimized.

In addition, according to the second exemplary embodiment, the first brake B1 is formed from a wet multiple disc brake, and the fourth clutch C4 is formed from a wet multiple disc clutch. Furthermore, the one-way clutch F1 is not provided. Consequently, in the automatic transmission according to the second exemplary embodiment, the third brake B3 is set in the fixed mode when the first transmission gear ratio is achieved.

The other configurations of the automatic transmission according to the second exemplary embodiment are the same as those of the first exemplary embodiment. The same reference symbol is used for the configurations of the second exemplary embodiment as in the first exemplary embodiment, and descriptions of the configurations are not repeated. Even when the automatic transmission of the second exemplary embodiment is employed, a 10-forward-speed and 1-reverse-speed transmission can be provided. In addition, in each of the transmission gear ratios, the number of the engagement mechanisms of the wet multiple disc clutches and the wet multiple disc brakes that are set in the release mode (the number of releases) is less than or equal to 4. Thus, although 10 speed transmission gear ratios are provided, an increase in friction loss from the friction loss in the existing 8-forward-speed transmission can be prevented.

Note that like the first exemplary embodiment, even in the second exemplary embodiment, the start clutch C0 may be provided instead of the torque converter TC.

(1) According to the embodiment, an automatic transmission including an input shaft rotatably supported inside a transmission case and rotated by a driving force received from a drive source is provided. Rotation of the input shaft is changed into rotation at a plurality of rotational speeds through a plurality of gear ratios and is output from an output member. The automatic transmission includes first to fourth planetary gear sets each including three elements representing a sun gear, a carrier, and a ring gear, where the three elements of the first planetary gear set are defined as a first element, a second element, and a third element in a collinear diagram capable of representing relative rotational speed ratios of the three elements in the form of straight lines. The first element, the second element, and the third element are arranged in the collinear diagram in sequence from one side of the collinear diagram at intervals corresponding to transmission gear ratios of the collinear diagram. The three elements of the second planetary gear set are defined as a fourth element, a fifth element, and a sixth element in a collinear diagram. The fourth element, the fifth element, and the sixth element are arranged in sequence from one side of the collinear diagram at intervals corresponding to transmission gear ratios of the collinear diagram. The three elements of the third planetary gear set are defined as a seventh element, an eighth element, and a ninth element in a collinear diagram. The seventh element, the eighth element, and the ninth element are arranged in sequence from one side of the collinear diagram at intervals corresponding to transmission gear ratios of the collinear diagram. The three elements of the fourth planetary gear set are defined as a tenth element, an eleventh element, and a twelfth element in a collinear diagram. The tenth element, the eleventh element, and the twelfth element are arranged in sequence from one side of the collinear diagram at intervals corresponding to transmission gear ratios of the collinear diagram. The first element is connected to the input shaft, and the tenth element is connected to the output member. The second element, the fifth element, and the ninth element are connected to form a first connected member, the third element is connected to the twelfth element to form a second connected member, and the eighth element is connected to the eleventh element to form a third connected member.

In addition, the automatic transmission include engagement mechanisms formed from first to fourth clutches and first to third brakes. The first clutch is switchable between a connection mode in which the first element is connected to the third connected member and a release mode in which the first element is disconnected from the third connected member. The second clutch is switchable between a connection mode in which the first element is connected to the fourth element and a release mode in which the first element is disconnected from the fourth element. The third clutch is switchable between a connection mode in which the sixth element is connected to the second connected member and a release mode in which the sixth element is disconnected from the second connected member. The fourth clutch is switchable between a connection mode in which any two of the tenth element, the second connected member, and the third connected member are connected to each other and a release mode in which the connected two are disconnected. The first brake is switchable between a fixed mode in which the seventh element is fixed to the transmission case and a release mode in which the seventh element is unfixed from the transmission case. The second brake is switchable between a fixed mode in which the sixth element is fixed to the transmission case and a release mode in which the sixth element is unfixed from the transmission case. The third brake is switchable between a fixed mode in which the fourth element is fixed to the transmission case and a release mode in which the fourth element is unfixed from the transmission case. Among the seven engagement mechanisms formed from the first to fourth clutches and the first to third brakes, by setting at least three engagement mechanisms in one of the connection mode and the fixed mode, nine or more forward transmission gear ratios are established.

According to the embodiment, as can be seen from the following exemplary embodiments of the present disclosure, nine or more forward transmission gear ratios can be established. In addition, among the seven engagement mechanisms (i.e., four clutches and three brakes), three engagement mechanisms are engaged in each of the transmission gear ratios so as to enter one of the connection mode and the fixed mode. Accordingly, the number of the engagement mechanisms that are not in the connection mode or the fixed mode (i.e., that are released) is four in each of the transmission gear ratios. Thus, unlike existing automatic transmissions in which a maximum of only eight forward gear ratios is achieved and four engagement mechanisms are released in each of the gear ratios, nine or more forward gear ratios can be achieved without increasing friction loss. As a result, the fuel efficiency of the vehicle can be increased by increasing the number of transmission gear ratios without decreasing the transfer efficiency of the automatic transmission.

(2) According to the embodiment, it is desirable that the third element be a ring gear of the first planetary gear set, the twelfth element be a sun gear of the fourth planetary gear set, the fourth planetary gear set be disposed outward of the first planetary gear set in a radial direction, and the sun gear of the fourth planetary gear set and the ring gear of the first planetary gear set be integrated with each other to form the second connected member.

In such a configuration, since the first planetary gear set overlaps the fourth planetary gear set in the radial direction, a shaft length of the automatic transmission can be reduced as compared with the case in which the first planetary gear set and the fourth planetary gear set is arranged along the axis line of the input shaft. Accordingly, the mountability of the automatic transmission can be improved in, in particular, FF drive vehicles.

(3) According to the embodiment, at least one of the fourth clutch, the first brake, and the third brake can be formed as a meshing mechanism, such as a dog clutch or a synchromesh gearbox. Since a meshing mechanism does not cause friction loss, friction loss existing in a transmission gear ratio in which any one of the fourth clutch, the first brake, and the third brake is in a release mode can be further reduced. Thus, the fuel efficiency of the vehicle can be increased.

(4) According to the embodiment, the automatic transmission can further include a one-way clutch. The third brake can be formed from a friction engagement clutch. In addition, the one-way clutch can be disposed parallel to the friction engagement clutch. The one-way clutch allows a normal rotation of the fourth element and inhibits a reverse rotation of the fourth element. Thus, friction loss can be reduced, and the transmission controllability can be increased.

(5) According to the embodiment, the automatic transmission may further include a start clutch capable of transferring the driving force of the drive source to the input shaft.

(6) Furthermore, according to the embodiment, the driving force of the drive source may be transferred to the input shaft via a torque converter.

Obviously, numerous modifications and variations of the present invention are possible in light of the above teachings. It is therefore to be understood that within the scope of the appended claims, the invention may be practiced otherwise than as specifically described herein.

What is claimed is:

1. An automatic transmission comprising:
   an input shaft rotatably supported inside a transmission case and rotatable by a driving force received from a drive source, a rotational speed of the input shaft being changeable into a plurality of rotational speeds through a plurality of gear ratios to be output from an output member;
   a first planetary gear set including a first sun gear, a first carrier, and a first ring gear defined as a first element, a second element, and a third element;
   a second planetary gear set including a second sun gear, a second carrier, and a second ring gear defined as a fourth element, a fifth element, and a sixth element;
   a third planetary gear set including a third sun gear, a third carrier, and a third ring gear defined as a seventh element, an eighth element, and a ninth element;
   a fourth planetary gear set including a fourth sun gear, a fourth carrier, and a fourth ring gear defined as a tenth element, an eleventh element, and a twelfth element, the first element being connected to the input shaft, the tenth element being connected to the output member, the second element being connected to the fifth and ninth elements to form a first connected member, the third element being connected to the twelfth element to form a second connected member, the eighth element being connected to the eleventh element to form a third connected member; and
   an engagement mechanism comprising:
      a first engagement device switchable between an engagement mode in which the first element is connected to the third connected member and a release mode in which the first element is disconnected from the third connected member;
      a second engagement device switchable between an engagement mode in which the first element is connected to the fourth element and a release mode in which the first element is disconnected from the fourth element;
      a third engagement device switchable between an engagement mode in which the sixth element is connected to the second connected member and a release mode in which the sixth element is disconnected from the second connected member;
      a fourth engagement device switchable between an engagement mode in which any two of the tenth element, the second connected member, and the third connected member are connected to each other and a release mode in which said two of the tenth element, the second connected member, and the third connected member are disconnected from each other;
      a fifth engagement device switchable between an engagement mode in which the seventh element is connected to the transmission case and a release mode in which the seventh element is disconnected from the transmission case;
      a sixth engagement device switchable between an engagement mode in which the sixth element is connected to the transmission case and a release mode in which the sixth element is disconnected from the transmission case; and
      a seventh engagement device switchable between an engagement mode in which the fourth element is connected to the transmission case and a release mode in which the fourth element is disconnected from the transmission case, nine or more forward transmission gear ratios being established by setting each of at least three engagement devices among the first to seventh engagement devices in the engagement mode.

2. The automatic transmission according to claim 1, wherein the first ring gear of the first planetary gear set is defined as the third element,
   wherein the fourth sun gear of the fourth planetary gear set is defined as the twelfth element,
   wherein the fourth planetary gear set is disposed outward of the first planetary gear set in a radial direction, and
   wherein the fourth sun gear of the fourth planetary gear set and the first ring gear of the first planetary gear set are integrated with each other to form the second connected member.

3. The automatic transmission according to claim 1, wherein at least one of the fourth engagement device, the fifth engagement device, and the seventh engagement device comprises a meshing mechanism.

4. The automatic transmission according to claim 1, further comprising:
   a one-way clutch to allow a normal rotation of the fourth element and to inhibit a reverse rotation of the fourth element,
   wherein the seventh engagement device comprises a friction engagement clutch, and
   wherein the one-way clutch is disposed parallel to the friction engagement clutch.

5. The automatic transmission according to claim 1, further comprising:
   a start clutch to transfer the driving force of the drive source to the input shaft.

6. The automatic transmission according to claim 1, further comprising:
   a torque converter to transfer the driving force of the drive source to the input shaft.

7. The automatic transmission according to claim 1,
   wherein the first sun gear of the first planetary gear set is defined as the first element,
   wherein the first carrier of the first planetary gear set is defined as the second element, and
   wherein the first ring gear of the first planetary gear set is defined as the third element.

8. The automatic transmission according to claim 1, wherein the second sun gear of the second planetary gear set is defined as the sixth element, wherein the second carrier of the second planetary gear set is defined as the fifth element, and wherein the second ring gear of the second planetary gear set is defined as the fourth element.

9. The automatic transmission according to claim 1, wherein the third sun gear of the third planetary gear set is defined as the seventh element, wherein the third carrier of the third planetary gear set is defined as the eighth element, and wherein the third ring gear of the third planetary gear set is defined as the ninth element.

10. The automatic transmission according to claim 1, wherein the fourth sun gear of the fourth planetary gear set is defined as the twelfth element, wherein the fourth carrier of the fourth planetary gear set is defined as the eleventh element, and wherein the fourth ring gear of the fourth planetary gear set is defined as the tenth element.

11. The automatic transmission according to claim 1, wherein the first sun gear of the first planetary gear set is defined as the first element, wherein the first carrier of the first planetary gear set is defined as the second element, wherein the first ring gear of the first planetary gear set is defined as the third element, wherein the second ring gear of the second planetary gear set is defined as the fourth element, wherein the second carrier of the second planetary gear set is defined as the fifth element, wherein the second sun gear of the second planetary gear set is defined as the sixth element, wherein the third sun gear of the third planetary gear set is defined as the seventh element, wherein the third carrier of the third planetary gear set is defined as the eighth element, wherein the third ring gear of the third planetary gear set is defined as the ninth element, wherein the fourth ring gear of the fourth planetary gear set is defined as the tenth element, wherein the fourth carrier of the fourth planetary gear set is defined as the eleventh element, and wherein the fourth sun gear of the fourth planetary gear set is defined as the twelfth element.

\* \* \* \* \*